(12) United States Patent
Cossais et al.

(10) Patent No.: US 11,685,611 B2
(45) Date of Patent: Jun. 27, 2023

(54) SYSTEM FOR LOADING AND UNLOADING PLATES INTO AND OUT OF A MACHINE PROCESSING CONTAINERS

(71) Applicant: SYNERLINK, Puiseux Pontoise (FR)

(72) Inventors: Dominique Cossais, Sainte Geneviève des Bois (FR); Gaëtan Doiteau, Le Mans (FR); Jean-Michel Royer, Puiseux Pontoise (FR)

(73) Assignee: SYNERLINK, Puiseux Pontoise (FR)

( * ) Notice: Subject to any disclaimer, the term of this patent is extended or adjusted under 35 U.S.C. 154(b) by 0 days.

(21) Appl. No.: 17/721,520

(22) Filed: Apr. 15, 2022

(65) Prior Publication Data

US 2022/0332517 A1 Oct. 20, 2022

(30) Foreign Application Priority Data

Apr. 16, 2021 (FR) ........................................ 2103974

(51) Int. Cl.
*B65G 47/04* (2006.01)
*B65G 35/06* (2006.01)
(Continued)

(52) U.S. Cl.
CPC ............. *B65G 47/04* (2013.01); *B65G 17/12* (2013.01); *B65G 17/345* (2013.01); *B65G 35/06* (2013.01);
(Continued)

(58) Field of Classification Search
CPC .... B65G 17/345; B65G 17/12; B65G 17/123; B65G 47/04; B65G 47/24; B65G 35/06; B65G 2201/0202; B65G 2201/0235
(Continued)

(56) References Cited

U.S. PATENT DOCUMENTS 2,870,900 A * 1/1959 Will ...................... B65G 17/12
198/550.11
4,627,530 A * 12/1986 Franke ................. B65G 17/123
198/799
(Continued)

FOREIGN PATENT DOCUMENTS

EP 770570 * 5/1997 ............. B65H 29/00
EP 0995700 A1 4/2000
(Continued)

OTHER PUBLICATIONS

Preliminary Search Report dated Dec. 16, 2021, corresponding to French Application No. 2103974, 9 pages.
(Continued)

*Primary Examiner* — James R Bidwell
(74) *Attorney, Agent, or Firm* — Maier & Maier, PLLC

(57) ABSTRACT

A handling system in a machine for processing containers, including a plurality of support plates circulating in a closed circuit, each support plate including one or more housings, each housing being able to hold a container, a first portion, in which the support plates circulate in a horizontal position along a first axial direction, a second portion, known as the return portion, with a second moving member configured to move the support plates in an opposite second axial direction X1B, the support plates circulating in the second portion in a vertical return orientation, the handling system including a holding pallet to selectively either unload the support plates from the second portion onto the holding pallet or for loading the support plates from the holding pallet into the second portion.

12 Claims, 10 Drawing Sheets

(51) Int. Cl.
*B65G 47/24* (2006.01)
*B65G 17/34* (2006.01)
*B65G 17/12* (2006.01)

(52) U.S. Cl.
CPC ...... *B65G 47/24* (2013.01); *B65G 2201/0202* (2013.01); *B65G 2201/0235* (2013.01)

(58) Field of Classification Search
USPC .......................................................... 198/801
See application file for complete search history.

(56) References Cited

U.S. PATENT DOCUMENTS

| | | | | |
|---|---|---|---|---|
| 5,141,128 | A * | 8/1992 | Pippin | .................... B65G 17/42 221/253 |
| 10,399,257 | B1 * | 9/2019 | Xie | ........................ B29C 39/24 |
| 2003/0226744 | A1 * | 12/2003 | Lykkegaard | ......... B65G 17/123 198/798 |
| 2019/0367291 | A1 * | 12/2019 | Papsdorf | ................ B65G 23/16 |
| 2021/0323773 | A1 * | 10/2021 | Boarin | .................... B65G 47/04 |

FOREIGN PATENT DOCUMENTS

| | | | | |
|---|---|---|---|---|
| EP | 1106541 | * | 6/2001 | ............. B65G 35/06 |
| EP | 2070843 | A1 | 6/2009 | |
| JP | S6356119 | U | 4/1988 | |
| JP | H0318009 | U | 2/1991 | |
| JP | H07204966 | A | 8/1995 | |
| JP | 2005178936 | A | 7/2005 | |

OTHER PUBLICATIONS

Office Action dated Feb. 27, 2023, in corresponding Japanese Application No. 2022-068173, 4 pages.

\* cited by examiner

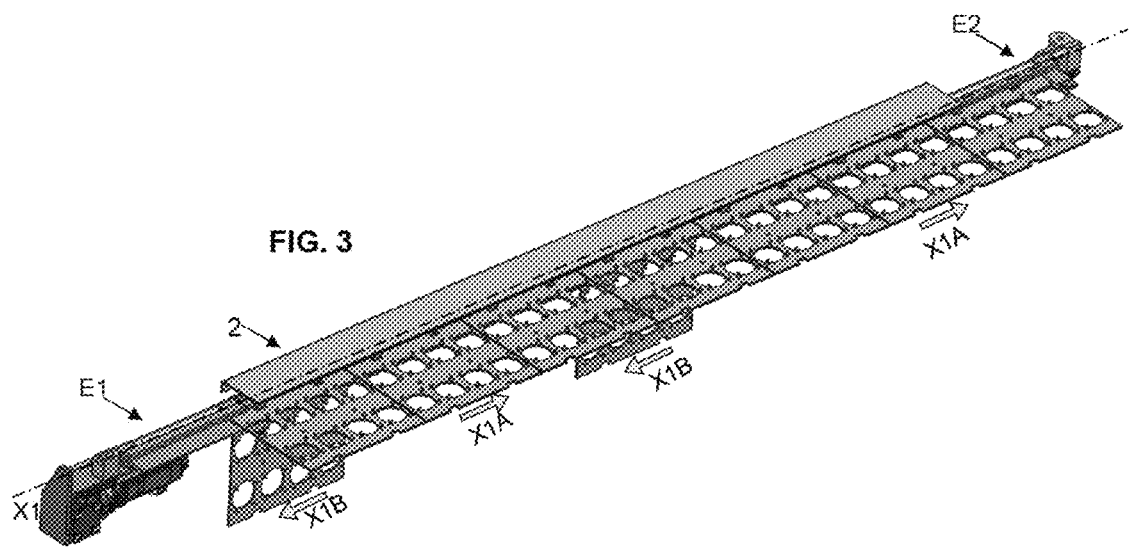
FIG. 3
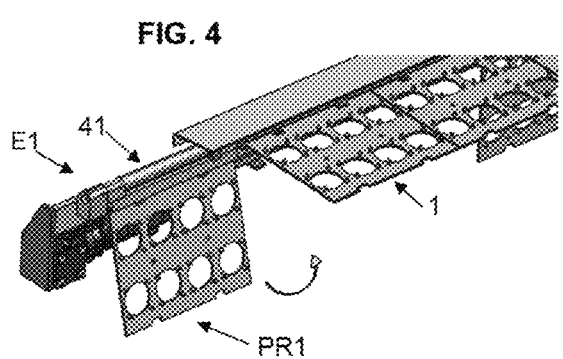
FIG. 4
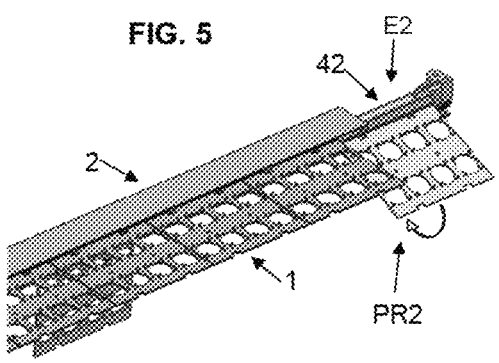
FIG. 5
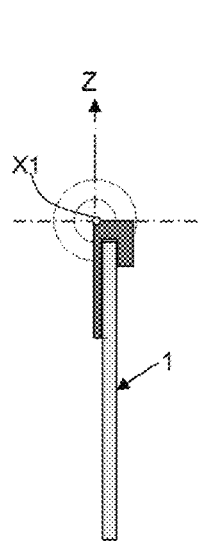
FIG. 8
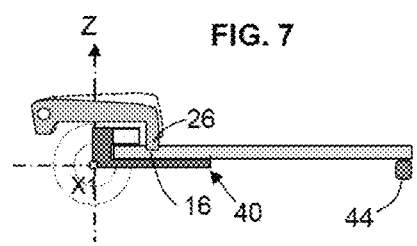
FIG. 6
FIG. 7

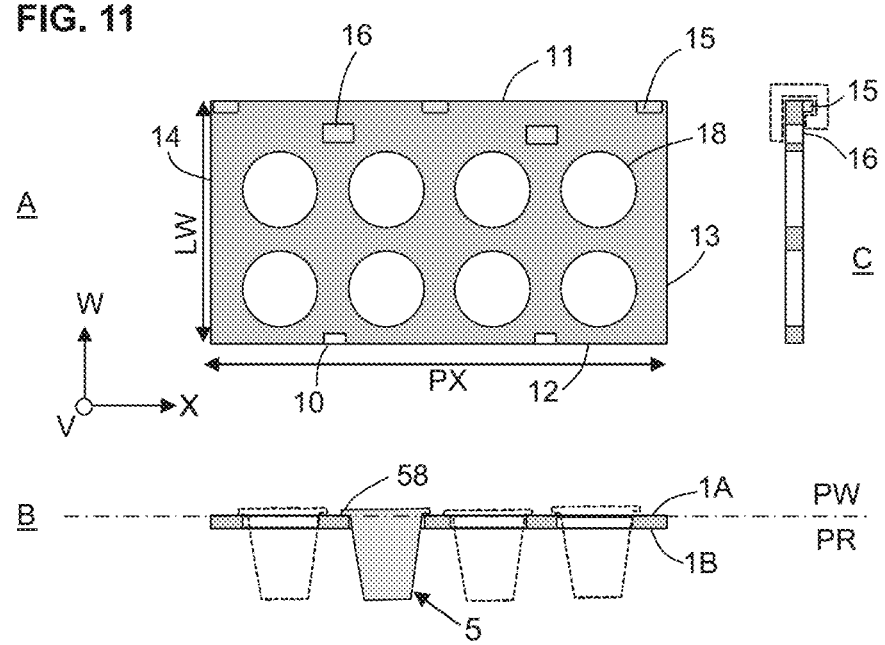
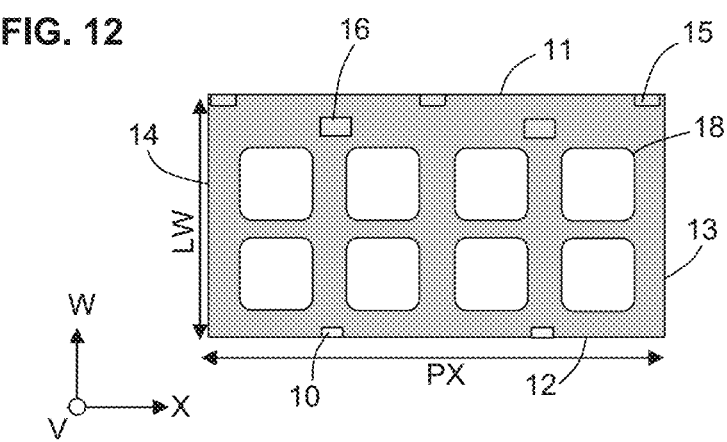

SYSTEM FOR LOADING AND UNLOADING PLATES INTO AND OUT OF A MACHINE PROCESSING CONTAINERS

FIELD

The present invention relates to handling systems in a machine processing containers for food products. These machines may also be referred to as production equipment or lines.

BACKGROUND

These machines (or "equipment" or "lines") are used to fill containers, for example pots or bottles, with one or more food products, for example a dairy product and/or food components, and to hermetically seal these containers, also optionally with marking, labelling, prior disinfection or some other operation.

These machines/equipment use supports, for example plates, to support the containers during the operations carried out in the machine.

These supports travel through a closed loop, returning empty after the processed container(s) have been unloaded from them.

This type of support plate is also used in machines or installations which process containers for non-food products, to which the present invention may be applied.

This type of installation operates in campaigns, each campaign making it possible to produce a series of mutually uniform products using the same support plates. Between each production campaign, it is necessary to reconfigure the installation and change to a different type of support plates for the upcoming campaign. It is the case that the size of production runs is tending to decrease, since clients operate increasingly on a just-in-time basis and end customers are buying smaller batches. It follows that the time required for changing the support plates in the installation is becoming a decisive factor.

A need to decrease the time required for unloading the support plates required for the production campaign that is ending and reloading other support plates required for the upcoming production campaign has therefore become apparent.

SUMMARY

To this end, a handling system in a machine for processing containers intended to hold a food product is therefore proposed, the handling system comprising:

a plurality of support plates circulating in a closed circuit, each support plate comprising one or more housings, each housing being able to hold a container, a first portion, known as the working portion, in which the support plates circulate in a horizontal position along a first axial direction X1A, with a first member for moving the support plates along the first axial direction, a second portion, known as the return portion, with a second moving member configured to move the support plates in a second axial direction X1B opposite to the first axial direction, characterized in that the support plates circulate in the second portion in a return orientation, said return orientation being vertical or angularly less than 30° away from the vertical, and in that the handling system comprises:

a first rotation station arranged at a first end of the handling system and configured, in normal operation, to pivot the support plates into the horizontal position in order to engage them in the first portion, a second rotation station arranged at a second end of the handling system and configured, in normal operation, to pivot the support plates into the return orientation in order to engage them in the second portion, and in that the handling system comprises at least one pallet for holding a plurality of support plates, which is configured to hold preferably all of the support plates required for the normal operation of the machine, said holding pallet cooperating with the first or the second rotation station (PR1, PR2) and the second moving member to selectively either unload the support plates from the second portion onto the holding pallet or to load the support plates from the holding pallet into the second portion.

By virtue of these provisions, the reconfiguration of the machine is extremely quick, and all of the support plates can be unloaded and a new set of support plates reloaded very quickly, if need be in an automatic mode, without any part of the handling system being removed.

Note that the unloading and reloading take place with the support plates in their return orientation, that is to say in a vertical or more or less vertical position. After unloading, the pallet with its plates can then directly pass into a washer without any other handling being required. Similarly, on leaving the washer, and after possible storage, the pallet with its support plates can be supplied for subsequent reloading of the machine without the plates being handled.

Note that it is possible, according to a first possibility, to unload all the plates of the preceding configuration in order then to load all the plates for the configuration to be started. However, according to a second possibility, it is possible to carry out a gradual exchange of the batch of plates, i.e. unload an "old" plate and replace it with a "new" plate, continuing until all the plates have been replaced.

Note that the second moving member is used in a particular way for the sequences of loading and unloading the support plates. For loading, the second moving member is used in a particular mode and the entire loading operation is carried out without removing any part of the handling system.

In various embodiments of the invention, it may be possible to also use one and/or another of the following provisions, taken individually or in combination.

According to one aspect, the first rotation station comprises a first rotary base, said rotary base being movable between a first position suitable for receiving a support plate arriving in the second portion in a return orientation and a second position suitable for placing a support plate in a horizontal position at the inlet of the first portion.

During normal operation, the first rotary base pivots the support plates into the horizontal position in order to engage them in the first portion.

According to one aspect, the holding pallet cooperates with the first rotation station. Unloading takes place at the downstream end of the return circuit, i.e. at the end of the second portion. The pallet is positioned under the first rotary base. Loading also takes place in this position, but the support plates are introduced into the second portion the wrong way around, meaning in the opposite direction to the direction used during normal operation.

According to one aspect, in a configuration for unloading the support plates from the second portion onto the holding pallet, the first rotary base remains in its second position so as to allow each support plate to enter the first rotation station with its return orientation, said support plate then being inserted into a space on the holding pallet.

According to one aspect, in a configuration for loading the support plates from the holding pallet into the second portion, the first rotary base remains in its second position and the second moving member operates in the opposite direction to its normal operation in order to remove each support plate from a space on the holding pallet and to move up each support plate to the second portion with its return orientation. Thus, all that is necessary is to program a particular manner of operation of the second moving member to carry out the automatic operation of reloading the support plates in the machine.

According to one aspect, the holding pallet comprises a plurality of spaces, which are spaced apart from and parallel to one another, and an offsetting mechanism, located on or off the pallet itself, is provided, so as to position a space in alignment with the travel of the support plates in the second portion, in order to unload or load a support plate respectively from or into the second portion.

To receive a new support plate, the pallet is offset along the transverse axis Y, that is to say horizontally and perpendicular to X.

According to one aspect, the support plates are held in a vertical position on the holding pallet and are kept in the spaces in a vertical position, additionally with a lack of mutual contact between the support plates. This favours washing and decontamination of the support plates. This also avoids mechanical damage to the support plates by contact during the movement of the holding pallet.

According to one aspect, when they are arranged on the holding pallet, the support plates are spaced apart by a predetermined distance, between 10 mm and 50 mm.

According to one aspect, when they are arranged on the holding pallet, the support plates are spaced apart by a predetermined distance, with an inter-plate offset P9 of between 1.5 EPP and 2.5 EPP; EPP representing the general thickness of the plate. It is thus possible to store around twenty plates or more on a pallet of reasonable size.

When the support plates do not project out of the plane, the distance P9 may be reduced to 1.2 EPP and it is thus possible to store a very large number of plates on the holding pallet without losing space.

According to another aspect, each support plate may comprise a turning plate. It is thus possible to process bottles, with an upside-down cleaning/disinfection operation, then turn them over, followed by filling and capping. Note that the holding pallet is compatible with holding both one-piece support plates and support plates provided with a turning plate.

According to one aspect, a stopping element for stopping the forward travel of the support plates toward the first rotary base under certain conditions is provided. In the normal operating mode, the stopping element prevents the arrival of the support plate at the first rotary base if the first rotary base is not in its first position. In the special unloading mode, the stopping element prevents the arrival of the support plate if a space in the holding pallet is not available for holding the support plate. Moreover, in the unloading mode, the first rotary base remains in its second position.

In other words, the stopping element can be activated or selectively retracted to allow a support plate to travel towards the first rotary base, either in normal operation or in the special unloading mode. Thus, in normal operation, at the first rotary station, the rotary base is expected to be in the vertical portion (first position) in order to retract the stopping element. By contrast, in the plate unloading mode, it is the availability of an aligned and empty space on the holding pallet which conditions the retraction of the stopping element to allow the passage of a plate arriving at the end of the second portion TC2 in order to load the pallet. The stopping element may be a selectively retractable stop.

According to one aspect, the handling system is such that, at the rotation station PR1, a stop is formed for the returning vertical plates waiting for the ad hoc position of the rotary base. A collection zone for the returning plates is thus formed, with the excess plates waiting being stored at this location.

According to one aspect, the second rotation station comprises a second rotary base. The second rotary base pivots the support plates into the return orientation in order to engage them in the second portion.

According to one aspect, the second moving member is in the form of a chain conveyor or of an endless belt conveyor. This type of solution is rugged and robust, and very reliable. Alternatively, it is possible to provide motor-driven rollers as the second moving member.

According to one aspect, the belt may rub against the plates or, according to a variant, the belt may have two sets of teeth (one set of teeth on the inside for driving the belt and one set of teeth on the outside for driving the support plates with the belt).

According to one aspect, the belt moves the support plates by a working strand of the belt rubbing against the lower face of the support plates. Alternatively, shoes fastened to the chain come into contact with the lower faces of the support plates in a vertical position in order to drive the plates.

According to one aspect, the holding pallet comprises a holding upright with slots for keeping the plates in a vertical position. Thus, when the pallet is offset along Y, or even moved on the forklift, the plates are firmly kept in a vertical position.

According to one aspect, in a configuration for loading the support plates, not only does the second moving member operate in the opposite way to its normal operation but the second rotary base can, for its part, also move up support plates into the first working portion and also the first moving member can operate in the opposite way to its normal operating mode. This makes it possible to load a large number of support plates which take up the entire second portion and a part of the first portion. In other words, the entire second portion and a part of the first portion are filled by pushing the plates from downstream to upstream.

According to one aspect, the system is such that, in normal operation, the number of plates in the first portion is more than twice the number of plates in the second portion. In this way, the total number of plates is minimized; the majority of the plates are used in the working portion and very few plates are present in the return portion. By contrast, note that, in a number of systems known from the prior art, the number of plates on the return path is equal to the number of plates in the outward working portion.

According to one aspect, the system is such that the average speed in the second portion TC2 is substantially greater, or even much greater, than the average speed in the first portion TC1. This characteristic may also result in the number of plates in the return portion being minimized.

According to one aspect, the plates have eight housings, or four or six or any other value. The invention works regardless of the number of housings provided in the plate.

According to one aspect, the plates have a longitudinal length PX of between 250 mm and 880 mm, preferably between 360 mm and 520 mm, and even more preferably between 400 mm and 480 mm.

According to one aspect, the plates have a thickness EPP of between 2 mm and 4 mm.

R+ According to one aspect, in the configuration for gradually exchanging the batch of plates, that is to say unloading an "old" plate and fitting a "new" plate in its place (continuing until all the plates have been replaced), a manipulator may be provided for pulling and/or pushing a plate with respect to a space in the second portion, this manipulator being controlled in conjunction with the above-mentioned mechanism for offsetting the spaces in the pallet.

The present invention also relates to a machine for processing pots or bottles for food products, comprising a handling system as described above.

Thus, the process modules can pass above and below without being impaired by the plate supports.

Further aspects, aims and advantages of the invention will become apparent from reading the following description of an embodiment of the invention, given by way of non-limiting example.

BRIEF DESCRIPTION OF THE DRAWINGS

The invention will also be understood better from studying the appended drawings, in which:

FIG. 3 illustrates a perspective view of a handling system according to one embodiment of the invention, FIG. 4 illustrates a perspective view of the region of the first rotation station arranged at a first end of the system, FIG. 5 illustrates a perspective view of the region of the second rotation station arranged at a second end of the system, FIG. 6 illustrates a cross section through the handling system in the first portion, known as the working portion, FIG. 7 is similar to FIG. 6, also illustrating the first moving member, FIG. 8 illustrates a cross section through the handling system in the second portion, known as the return portion, FIG. 11 illustrates a plate in a top view (A), a side view (B) and a frontal view (C), FIG. 12 illustrates a frontal view of a plate variant.

In the various figures, the same references denote identical or similar elements. For reasons of clarity of the description, certain elements may intentionally not be depicted to scale in the drawings.

DETAILED DESCRIPTION

General Features and General Arrangement

Figure 1:
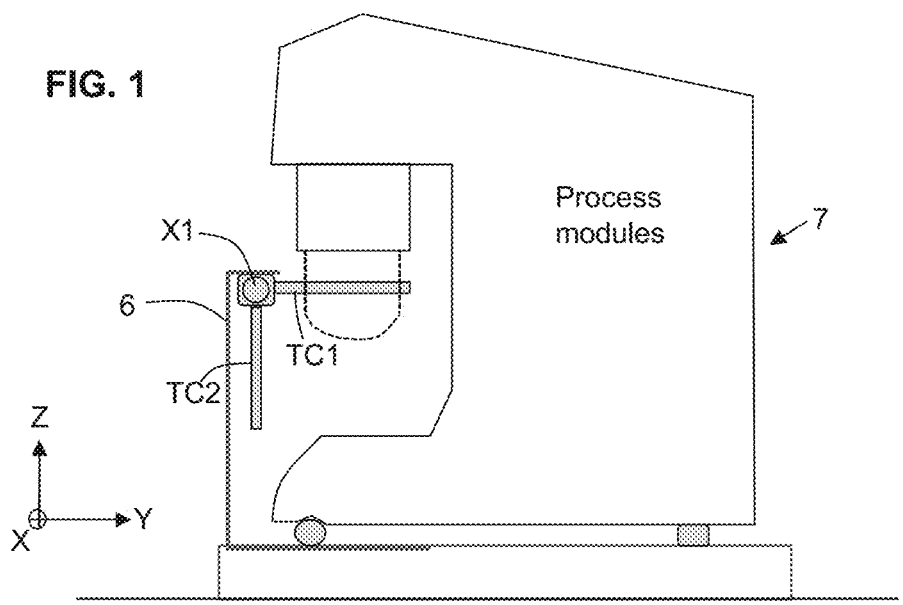
FIG. 1 illustrates a profile view of a machine or equipment comprising a plate system according to the present invention.
Figure 2:
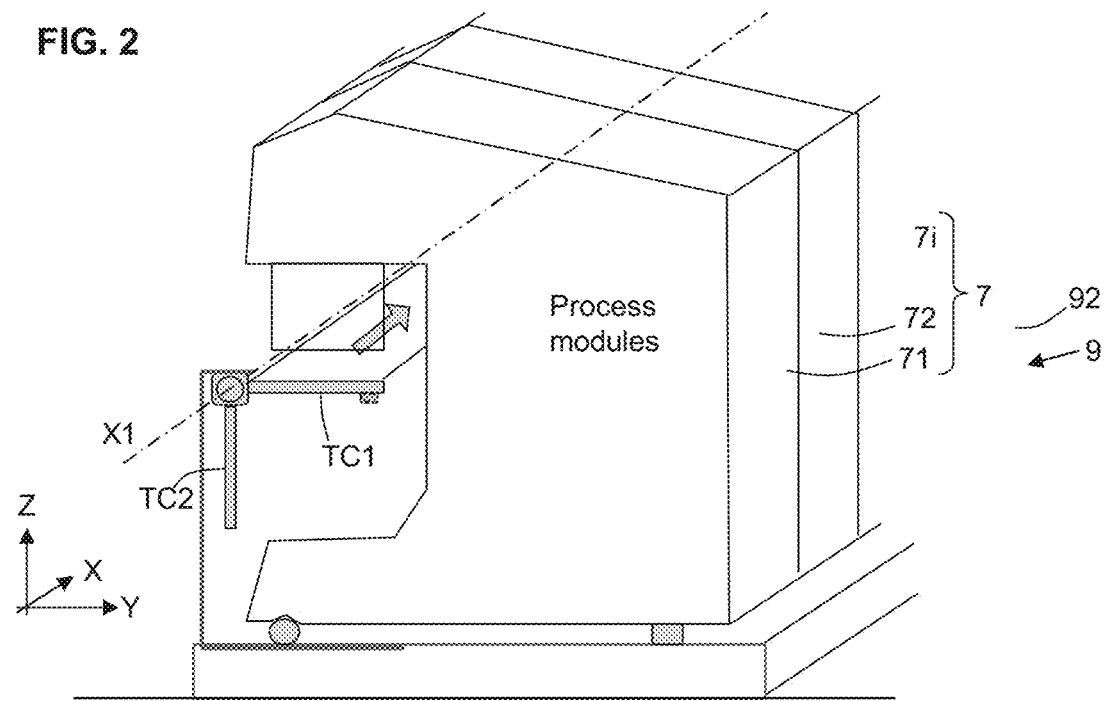
FIG. 2 illustrates a perspective view of the machine in FIG. 1.

FIGS. 1 and 2 show a machine processing containers for food products. These may be milk products, syrups, beverages of all kinds, or even pasty or powdery products. The present invention applies in fact to any food product.

In particular the handling system employed in these machines is of interest here. However, note that the handling systems described below are applicable to any production line, even outside the food sector.

Returning to the food sector, these machines/equipment/lines are used to fill containers, for example pots or bottles, with one or more food products, for example a dairy product and/or food components, and to hermetically seal these containers. Optionally, marking, labelling or prior disinfection operations may also be provided. Any other operation is not ruled out, however. FIGS. 1 and 2 illustrate processing modules that are juxtaposed in the axial direction of the machine and respectively bear the references 71, 72, 7i. The different processing modules or process modules collectively bear the reference 7.

Supports, referred to as support plates, or even simply as plates, are used to support the containers during the operations carried out in the machine.

These supports, which generally bear the reference 1, travel through a looped, that is to say closed, circuit, in the machine, and they return empty after the processed container(s) has/have been unloaded from them.

According to a general arrangement, the handling system comprises a first portion TC1, known as the working portion. Moreover, the handling system comprises a second portion TC2, known as the rapid return portion.

Note here that the combination of the first portion TC1 and of the second portion TC2 jointly forms a closed circuit, that is to say a looped circuit in normal operation, with the rotation stations, described below, at the ends.

At one location, each support plate 1 is loaded with empty containers, and at another, downstream, location, the filled containers are removed from the support plate 1.

Each support plate 1 comprises one or more housings 18, each housing 18 being able to hold a container.

According to a first possibility, the container is held at the top, in which case an upper edge 58 of the container bears on an edge of the housing under the effect of gravity. The housing may be in the form of an orifice. According to this first possibility, the container is typically a pot 5 with a collar 58 wider than its body.

According to another possibility, the container can be received by lateral insertion, a throat of the container being accommodated in a housing having a mouth and a narrowing. After the throat of the container has passed through the narrowing, the container remains held in a hole with a size corresponding to the size of the throat. According to this other possibility, the container is typically a bottle with a throat and a neck.

The number of housings may be four or eight. However, there may be any number of housings, from two to 16.

According to a general arrangement, the handling system comprises a first end E1 and a second end E2.

As illustrated in FIGS. 3 to 5, according to a general arrangement of the system, a first rotation station PR1 arranged at the first end E1 and configured to pivot the support plates into the horizontal position in order to engage them in the first portion TC1 is provided. Moreover, a second rotation station PR2 arranged at the second end E2 and configured to pivot the support plates into the return orientation in order to engage them in the second portion TC2 is provided.

The working longitudinal axis (i.e. of the machine) is denoted X; a reference longitudinal axis of the handling system denoted X1 is defined. The transverse axis of the machine is denoted Y and the local vertical axis is denoted Z.

Figure 17:
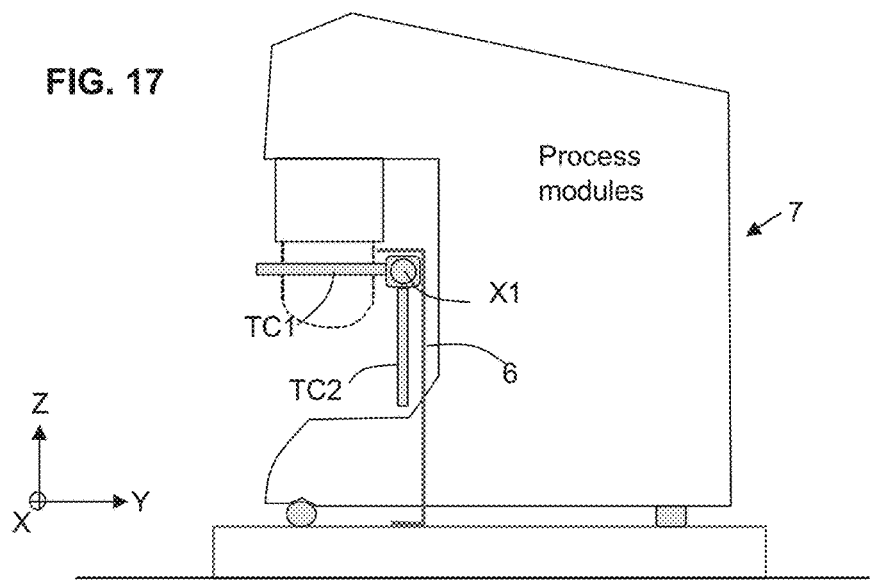
FIG. 17 is similar to FIG. 1 and shows a variant of the general arrangement of the handling system with respect to the machine.

The entire handling system is supported by a general support frame referenced 6 (depicted only generically in FIGS. 1, 2 and 17).

Note that two configurations are possible. In FIGS. 1 and 2, the axis X1 is situated on the outside of the machine, meaning that the plates 1 in the portion TC1 are located between the axis X1 and the process modules 7. In FIG. 17, the opposite is the case, and so the axis X1 is situated on the inside of the machine, meaning that the axis X1 is located between the plates 1 in TC1 and the process modules 7.

Support Plates and their Circulation

As can be seen in FIGS. 3 to 9 and 11A, 11B, 110 and 12, each support plate 1 extends generally in a reference plane PR with a rectangular overall shape. Each support plate comprises two short sides, referenced 13 and 14, respectively, parallel to the Y direction of the machine. Each support plate has two long sides parallel to the longitudinal direction X of the machine, namely a first long side 11 forming a guiding and manoeuvring edge, and another long side 12 forming a free edge. The longitudinal length denoted PX is in this case between 400 mm and 480 mm. However, more generally, the length PX may be between 250 mm and 880 mm, or between 360 mm and 520 mm. The width of the plate, denoted LW, is in this case between 250 mm and 350 mm. However, more generally, the width LW may be between 200 mm and 500 mm.

Each support plate is made in one piece. Each support plate is flat. The thickness of a plate EPP may typically be between 1 and 3 mm. Typically, the starting point is a flank of constant thickness and notches and grooves are made therein, which will be discussed below. According to one example, the thickness EPP may be 8 mm. According to another example, the thickness EPP may be between 6 mm and 8 mm.

Each support plate 1 comprises an upper face 1A and a lower face 1B.

Each support plate 1 can be made of stainless steel or of a food-compatible metal alloy. However, a material of the food-compatible hard plastic type, such as polypropylene or polycarbonate may also be suitable.

In the first portion TC1, the support plates circulate in a horizontal position in a first axial direction X1A. In the various illustrations, the plates are adjacent to one another in the first portion. However, they are not precluded from being slightly spaced apart from one another.

In the return portion TC2, the support plates travel forward in a second axial direction X1B opposite to the first axial direction. In this second portion TC2, the support plates circulate in a position or orientation which is different from the horizontal position. The term "return orientation" is used for this position. Said return orientation is vertical in the example depicted. In a variant that is not shown, the return orientation may be angularly less than 30° away from the vertical, that is to say not far away from the vertical position.

The first long side 11 forms a guiding and manoeuvring edge. The guiding and driving functions are located in the vicinity of this long side. The edge corresponding to this long side is received in one or more groove(s) for guiding and receiving guides and rotary bases, as will be described below.

The opposite edge 12 is only guided but not driven. The drive is thus relatively simple and is located in the vicinity of the longitudinal axis X1 of the handling system.

Figure 9:
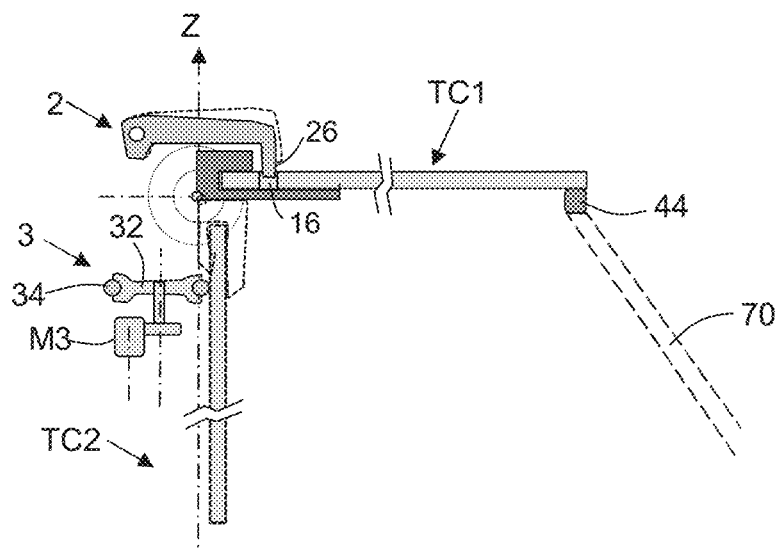
FIG. 9 illustrates a cross section through the handling system with the auxiliary support guide.

According to another characteristic, the opposite long edge 12 may be supported by an auxiliary guide 44. This auxiliary guide may be continuous or discontinuous; as illustrated in FIG. 9, this auxiliary guide 44 may be carried by an arm 70 secured to one of the abovementioned process modules 7i. This auxiliary guide 44 is preferably removable.

With reference to FIGS. 11 and 12, it can be seen that the housings provided in the support plate can be round or square depending on the shape of the pots to be processed.

Each support plate comprises at least one notch 16 for receiving a finger of the first moving member. Note that the notch(es) 16 preferably pass(es) through the thickness of the plate. This is easy to clean and prevents contaminants from getting trapped in a blind hole.

In the example illustrated, each support plate comprises two notches.

Moreover, according to one option, a protrusion 15 forming a projection out of the plane is provided, this serving to keep the plate in particular in its vertical orientation.

According to one configuration, rather than a protrusion, a longitudinal groove referenced 19 is used to hold the plate, a longitudinal rib 28, 29 provided in plate guiding means being accommodated in said groove.

In a variant that is not shown, the position of the notches 16 for the forward travel of the plates and the position of the longitudinal groove 19 for holding and guiding may be coincident.

Moreover, auxiliary notches referenced 10 may be provided, the usefulness of which, in particular in the vertical position, will be shown below.

Note also that the plate may have a square rather than rectangular overall shape.

Moreover, note that the short sides are not necessarily straight and may comprise a convex or concave step.

Moving Members

Provided in the first portion is a first member 2 for moving the support plates along the first axial direction X1A. In an illustrated configuration, the first member is of the stepping type. However, note that any other moving mechanism can be envisaged in the scope of the present invention.

The first moving member 2 comprises, in the example illustrated, a transfer bar 21 which extends generally along the axial direction and is mounted so as to pivot about the axis X1.

The transfer bar 21 of the first moving member 2 comprises a finger 26 at a distance from the axis X1 and configured to be received in a notch 16 in the plate, the finger being unladen when the finger 26 is not engaged.

Figure 13:
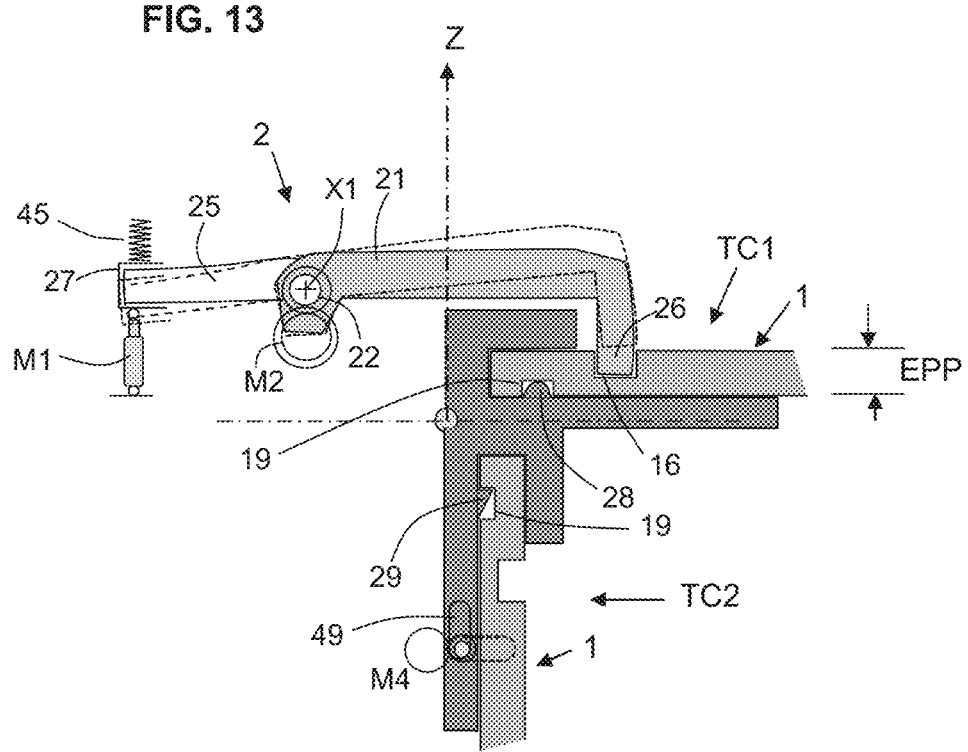
FIG. 13 is similar to FIG. 9 and illustrates in more detail a cross section through the handling system according to one variant, at the longitudinal axis.
Figure 14:
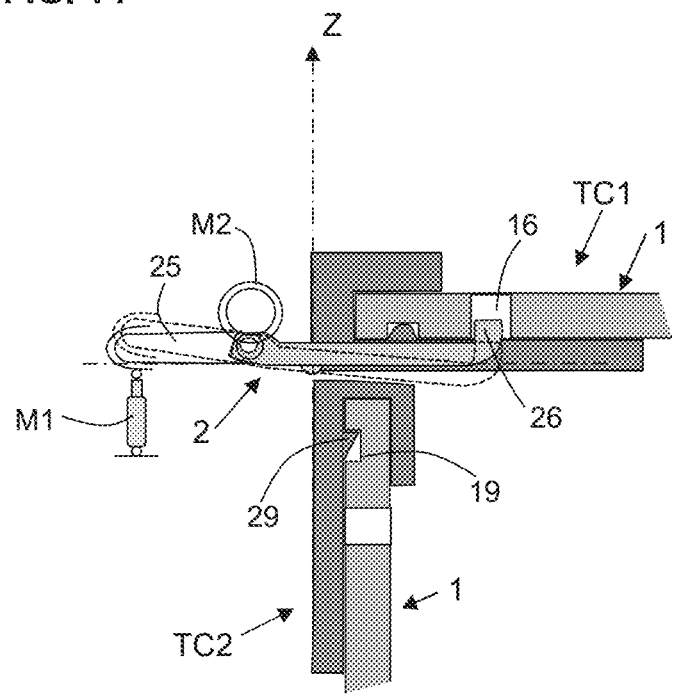
FIG. 14 is similar to FIG. 9 and illustrates in more detail a cross section through the handling system according to another variant, at the longitudinal axis.

As illustrated in FIGS. 13 and 14, the transfer bar 21 of the first moving member 2 operates with two degrees of freedom, namely a rotation about X1 and a forward movement along the axial direction. The rotation allows the engagement and disengagement of the finger 26 in and from a notch 16.

Figure 10:
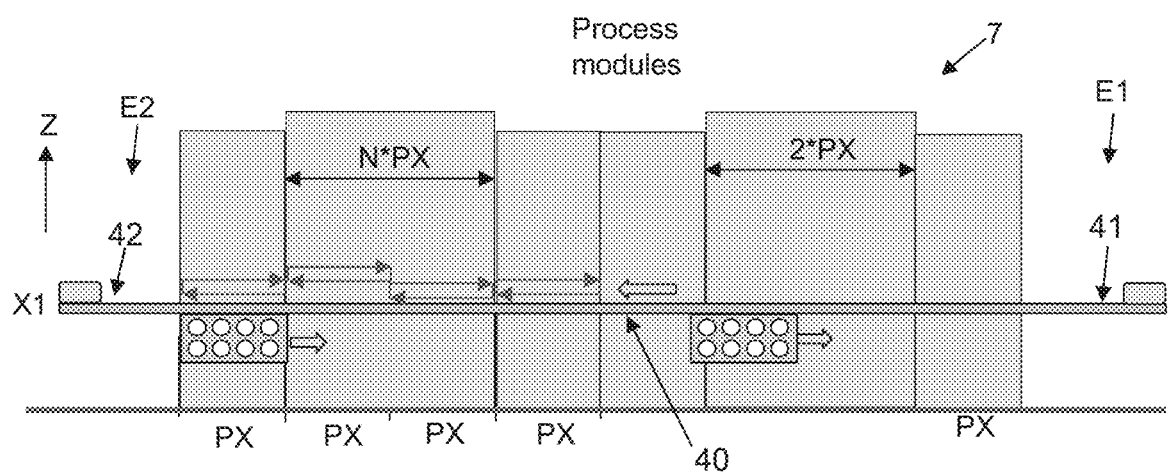
FIG. 10 shows a frontal view of the machine.

The axial movement in translation makes it possible to move one or more plates forward by a predetermined distance in the first portion. In the example illustrated in FIG. 10, the predetermined distance coincides with the axial length of the plate, namely the pitch PX. According to other possibilities, for example with two notches per plate, the forward travel distance on each movement of the transfer bar may be PX/2. According to other possibilities, for example with four notches per plate, the forward travel distance on each movement of the transfer bar may be PX/4.

The axial movement in translation is realized either by an endless screw and captive nut mechanism or by a rack-pinion mechanism, or by means of a long stroke electric cylinder. It is generally possible to use any axial translation mechanism known per se.

An axle shaft denoted 22, which may be fixed or secured to the transfer bar itself, is provided. The device also comprises a motor denoted M2, or a geared motor, which is placed in the vicinity of the axle shaft. An output pinion engages with a rack or a helical toothset in order to move the transfer bar 21 along the longitudinal direction X1, with rotation of the axle shaft 22 or not depending on the possible configurations.

Where the engaging and disengaging movement of the finger is concerned, the transfer bar is equipped with a rear lever referenced 25 securely connected to the body of the transfer bar; the rear lever 25 is received in a sliding connection 27. The rear lever 25 can thus slide longitudinally along X1 in the slide 27. As in the case illustrated in FIG. 13, a single-acting control cylinder denoted M1 and a return spring 45 are provided. The effect of the return spring is to tilt the transfer bar about the axis X1 to the disengaged position of the control finger 26, whereas, by contrast, the actuation of the cylinder M1 has the effect of tilting the transfer bar in the opposite direction and engaging the control finger in the notch 16.

FIG. 14 illustrates the case of a double-acting cylinder; in this case, the cylinder is commanded in one direction to disengage the control finger, and commanded in the opposite direction to engage the control finger 26 so as to move the plates forward.

Thus, the first moving member 2 can be referred to as a "transfer shuttle". Any other solution for causing at least one plate to move forward by a predetermined distance can also be envisaged.

As regards the number of fingers 26, as many fingers can be provided as there are spaces for support plates in the first working portion; under these conditions, the transfer shuttle simultaneously engages all the plates situated in the working portion TC1. Thus, the transfer bar 21 and the axle shaft 22 travel along more or less the entire length of the handling system, possibly except for the ends. Thus, the plates do not push one another and are not necessarily adjacent. This also makes it possible to operate the tested machine with only a few plates.

In another variant, the transfer shuttle engages only the first plate situated at the start of the first portion and the plates push one another as far as the end of the first portion. The axle shaft and the transfer bar are thus much shorter, that is to say the order of magnitude corresponding to the length of a plate PX or slightly more.

Figure 15:
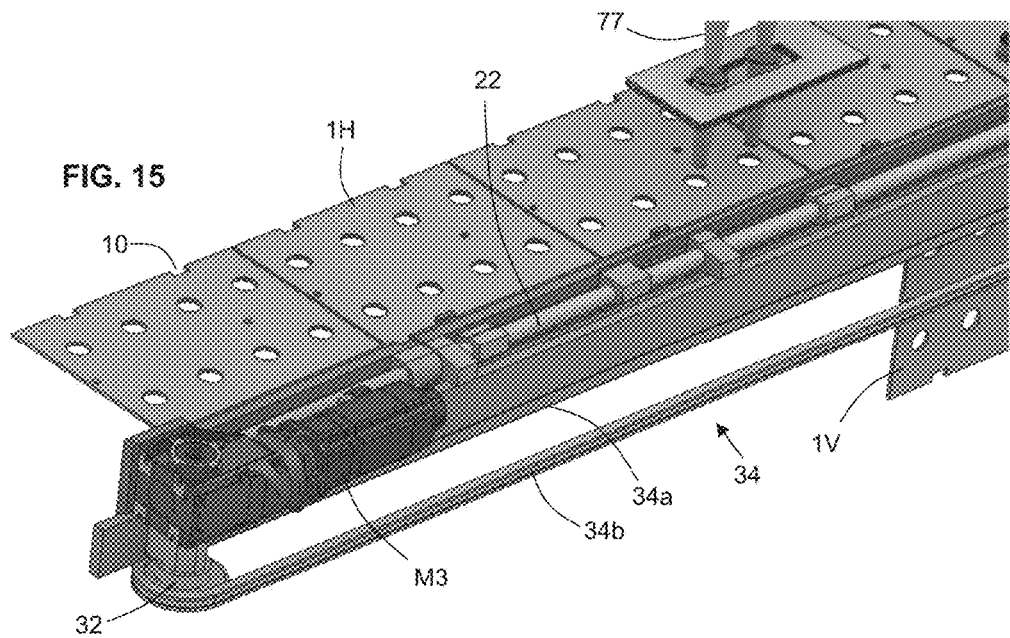
FIGS. 15 and 16 illustrate the belt conveyor and the drive thereof, having the function of driving the plates along the second portion.

Alternatively, the transfer shuttle may work underneath, as illustrated in FIGS. 14 and 15, this case being illustrated below. When the transfer bar 21 is situated beneath the upper face 1A of the plates in the working portion, the region situated above the working plane referenced PW is free of any element that may represent an impairment risk of contamination.

When the cylinder M1 pushes upward, the control bar tilts about X1 and the control finger 26 is disengaged from the notch 16. By contrast, when M1 pushes downward, the control bar tilts in the opposite direction about X1 and the control finger 26 is engaged in the notch 16.

The handling system comprises a second moving member 3 configured to move the support plates in the second axial direction X1B in the second portion TC2. The second moving member is preferably of the continuous type.

Figure 16:
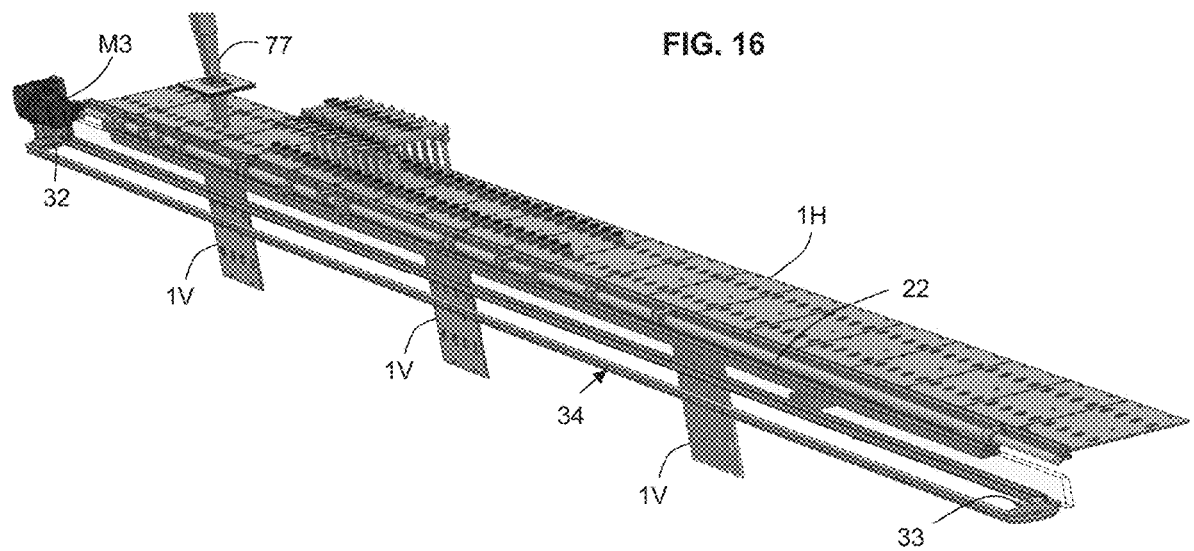

As can be seen in FIGS. 9, 15 and 16, the second moving member comprises an endless belt referenced 34. This belt is guided and driven by two belt pulleys, one of which is a driving pulley 32 driven by a motor M3 and one of which is a follower pulley 33 at the other end of the belt. The belt rubs against the lower face 1B of the plates, in the return orientation position, namely in the vertical position, in order to drive them from the second end E2 to the first end E1.

The belt may rub against the plates or, according to a variant, the belt may have two sets of teeth. In the latter case, one set of teeth is provided on the inside to drive the belt by way of a driving pulley and a set of teeth on the outside for driving the support plates by way of the belt in the return portion TC2.

Rather than the belt, the second moving member may be formed by a chain of articulated links mounted in a loop on two sprockets at the ends. A first sprocket is a driving sprocket and the other is mounted on a support returned elastically by a spring in order to tend to maintain sufficient tension in the chain permanently. Shoes fixed on the outside of certain links of the looped chain may be provided in order to bear on the plates in their vertical position and to drive the plates.

More specifically, a working strand 34a is arranged in contact with the plates which are located in the second portion, while a return strand 34b is at a distance from the plates and serves for the unladen state. The rate of forward movement of the working strand of the belt is relatively fast. In practice, it is at least equal to the rate of forward movement of the transfer bar in the opposite direction. For example, the rate of forward movement of the belt 34 may be at least equal to 500 mm per second.

The drive of the plates in the second portion could be different from the one illustrated, for example a system involving a pulse, return by gravity, or any other solution made possible by the fact that there is no working operation on the plates in this return portion.

As illustrated in FIGS. 6 to 8, the first rotation station PR1 comprises a first rotary base 41 on the side of the first end E1. The first rotary base pivots the support plates into the horizontal position in order to engage them in the first portion TC1. The first rotary base may be in the form of an element mounted so as to rotate about an axis coincident with X1 or close to the latter, this element being driven into angular position by a geared motor with two end-of-travel sensors or a stepping motor with an end-of-travel sensor.

The first rotary base 41 is therefore movable between a first position suitable for receiving a support plate arriving in the second portion in a return orientation and a second position suitable for placing a support plate in a horizontal position at the inlet of the first portion.

A retractable stop 49 may be provided, which makes the inlet of a returning vertical plate into the rotary base 41 dependent on a vertical receiving position of this rotary base. The retractable stop 49 is controlled selectively by a small actuator M4.

In a variant, the retractable stop may be a form integrated into the flank of the rotary base 41, without requiring a specific control other than the rotation of the rotary base 41.

On the side of the second end E2, the second rotation station PR2 comprises a second rotary base 42. The second rotary base pivots the support plates into the return orientation in order to engage them in the second portion TC2.

The second rotary base may be in the form of an element mounted so as to rotate about an axis coincident with X1 or close to the latter, this element being driven into angular position by a geared motor with two end-of-travel sensors or a stepping motor with an end-of-travel sensor. If the path is free, the second rotary base pivots the plate into a vertical position and inserts it immediately into the second return portion TC2.

Each of the rotary bases comprises a groove for receiving the longitudinal edge, i.e. the long side 11 forming a guiding and manoeuvring edge.

Both the first rotary base and the second rotary base comprise a plate holding means. When the plate contains a projection out of the plane 15, the rotary bases comprise a housing forming slides for receiving this plane projection (cf. FIG. 11).

In a variant, each support plate 1 has a guiding groove 19. The rotary bases comprise a protruding rib 29 which supports on the interior of the groove 19 formed in the plates. (cf. FIGS. 13 and 14, bottom part).

Moreover, a fixed main guiding support 40, disposed continuously along the first axial direction X1A, is provided between the first and second rotary bases 41, 42. The support is thus continuous for the plates from the first end E1 to the second end E2.

The main guiding support comprises a rib 28 which allows the longitudinal guiding of the plates, the rib 28 being received in the groove 19.

As illustrated in FIG. 13, the main guiding support is in the form of a profiled element having a generally constant section along X1. In other words, the main guiding support 40 forms a guiding rail. This rail/profiled element makes it possible to guide the plates in a horizontal position which pass through the first portion TC1, and also to guide the plates in a vertical position in the second portion TC2, in which they return.

This type of system with support plates can also be used in machines or installations which process containers for non-food products, to which the present invention may be applied.

Operation

In the first working portion, the plates are moved sequentially from one station to another by the first moving member 2 described above. The plates are in a horizontal position referenced 1H in FIGS. 15 and 16. Depending on the configuration of the machine, various operations are carried out at a fixed station, in the period of time between the outward movements of the transfer bar. According to a very simplified example, illustrated in FIG. 15, metering nozzles referenced 77 are provided, located at the location of one of the positions of the plate.

At the end of the working portion TC1, the second rotary base 42 rotates each support plate 1 about the reference longitudinal axis X1 through an angle $\theta$ (90° in a typical case). Thereafter, each plate travels along the return portion, substantially maintaining this orientation. The plates are in a vertical position referenced 1V in FIGS. 15 and 16. The plates are moved along the second portion TC2 by the second moving member 3 described above.

Thereafter, the first rotary base 41 rotates the support plate with a rotation in the opposite direction about the longitudinal axis X1 through an angle $-\theta$, that is to say opposite to the angle applied by the second rotary base.

In relation to the full operation in a loop, note that the first portion TC1 is entirely occupied by the plates, while the second portion TC2 comprises only a few plates, as can be seen in FIG. 16.

Thus, the number of plates in the first portion may be between about ten and about 30 depending on the configuration of the machine. By contrast, there are only one to four plates in the return portion TC2.

Figure 18:
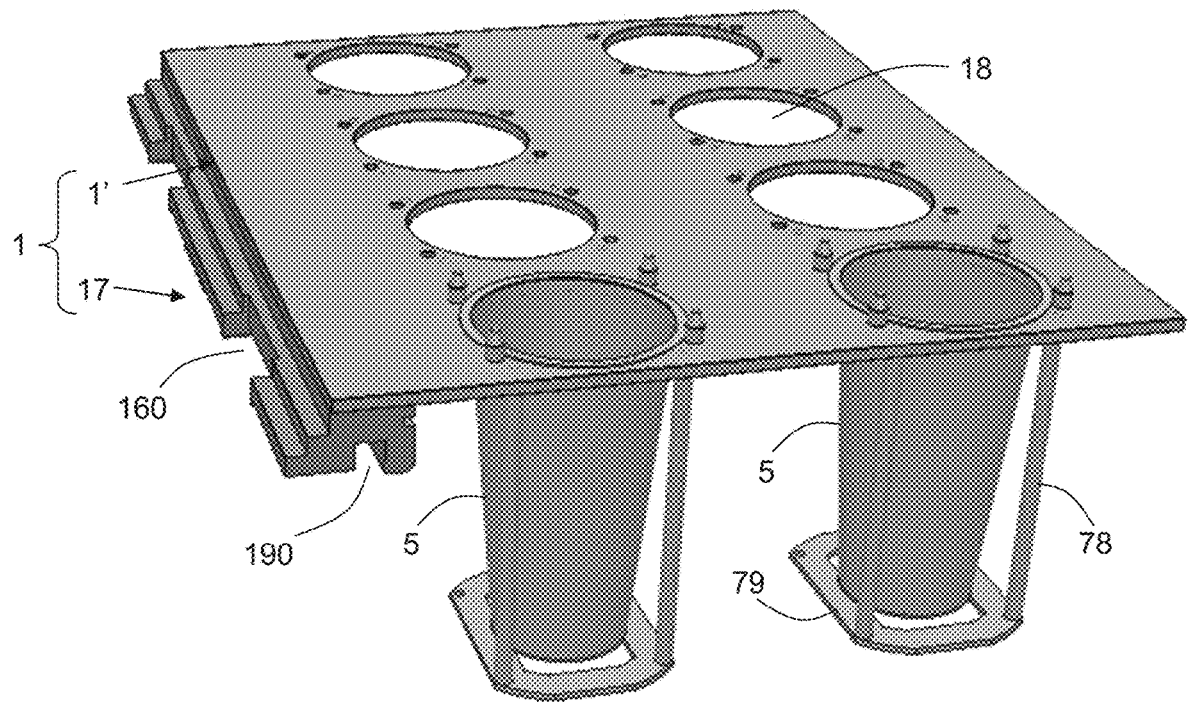
FIG. 18 shows a perspective view of a plate, and illustrates a second embodiment relating to the support plates and the holding of the containers in the housings in the plates.
Figure 19:
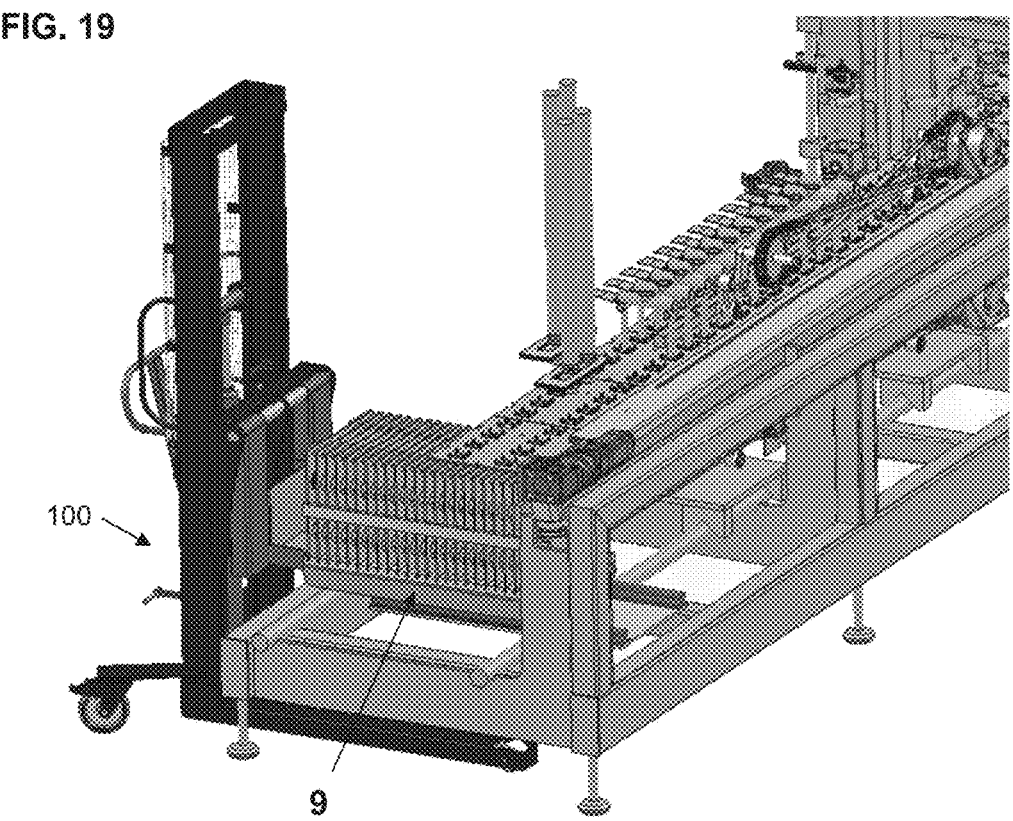
FIG. 19 illustrates a perspective view of the handling system with the system of holding pallets for loading and unloading the support plates.

According to a second embodiment of the plates, FIG. 18 illustrates a variant in which containers which do not have a collar are processed in a particular case. In this case, the container does not rest directly on the plate but on a shoe 79 arranged at a distance beneath the plate, this distance corresponding to the height of the container 5 to be processed. This shoe is connected to the plate by four small posts 78.

Any other solution for resting the container 5 on a bottom support similar to the abovementioned shoe may also be suitable.

Note that in the following text, everything that is not described in particular should be considered as being identical or similar to the description given above for the handling system in relation to FIGS. 1 to 17.

According to a variant illustrated in FIG. 18, the plates are made in two parts, namely a flat plate part denoted 1' with housings 18, and also a technical profiled element 17 for the guiding and driving functions. The technical profiled element 17 for guiding and driving has a guiding groove 190, the functions of which are identical to the above-described groove 19.

In this case, the technical profiled element 17 for guiding and driving has two notches 160 arranged in the edge face of the plate, on the side of the long side. The technical profiled element 17 has a length PX identical to the longitudinal dimension of the plate PX. The flat plate 1' is obtained from a blank in which drilled holes are made, and therefore it is easy to produce.

The technical profiled element 17 is fixed under the plate, i.e. fixed to the lower face 1B of the plate 1'. Nothing protrudes from the upper plane 1A of the plate. The technical profiled element 17 is obtained by moulding plastic.

Loading and Unloading the Plates

The installation comprises a system for loading and unloading the support plates. In particular, provision is made for it to be possible to unload the support plates present in the looped circuit of the machine, in the direction of a holding pallet for the support plates, referenced generally 9 in the figures.

In the example illustrated, this holding pallet is moved up to the position of the first rotation station. In the example illustrated, it is installed under the first rotary base 41. The holding pallet 9 receives the support plates one after another from the second portion TC2 of the handling system.

The holding pallet comprises a plurality of spaces 94. In the example illustrated, each of these spaces is in the form of grooves parallel to the longitudinal axis X of the machine, these spaces also being referred to as "slots". Several spaces are disposed parallel to and alongside one another, spaced apart along the transverse axis Y. The transverse offset between the grooves (that is to say the centre-to-centre spacing of two adjacent grooves) represents a distance P9 (cf. FIGS. 21 and 24).

The distance P9 may be between 10 mm and 50 mm.

The distance P9 may be between 1.5 EPP and 2.5 EPP, EPP representing the overall thickness of the plate.

At the bottom of the grooves, shapes complementary to the notches referenced 10 formed in the free edge 12 of each support plate may be provided. These complementary shapes allow indexing of the plates on the pallet in the longitudinal direction X. These lateral notches 10 may also be used for indexing purposes at the processing stations.

Figure 21:
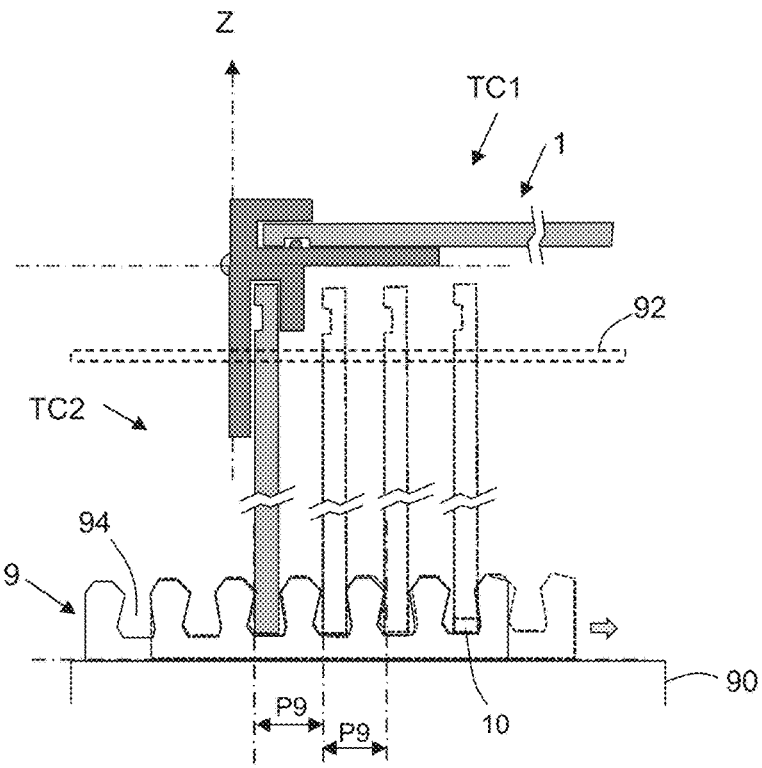
FIG. 21 shows a schematic section through the holding pallet.

Also provided is a holding upright 92 with slots for keeping the plates in a vertical position, as illustrated in FIG. 21. The holding upright also forms a stop for the insertion movement at the bottom of the support plate on the pallet along X.

In the example illustrated, the holding pallet 9 comprises a number of spaces of between 16 and 32. Of course, the number of spaces could be smaller than these values or greater than these values.

A frame 90 is provided, on which the pallet can slide, the frame being arranged in a fixed position during the loading or unloading operation. A sliding system 96 makes it possible to slide the pallet with respect to the frame.

Moreover, an item of equipment of the forklift type 100 is provided for supporting the pallet at the time of the operation or for recovering the pallet after the operation (in this case, the frame 90 supporting the pallet may be set down and indexed on the general frame 6 of the handling system).

Figure 22:
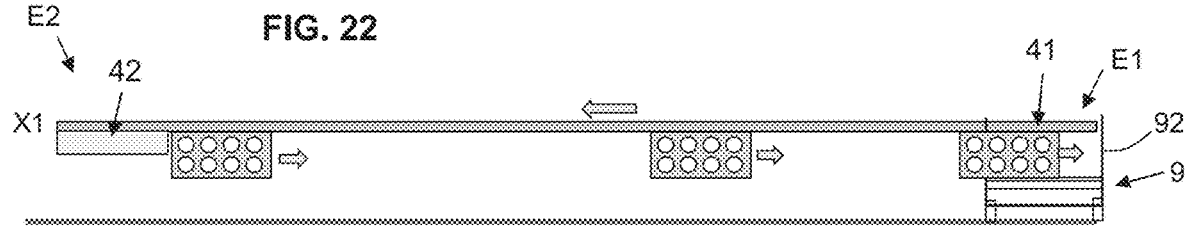
FIG. 22 illustrates the operation of unloading the support plates.
Figure 23:
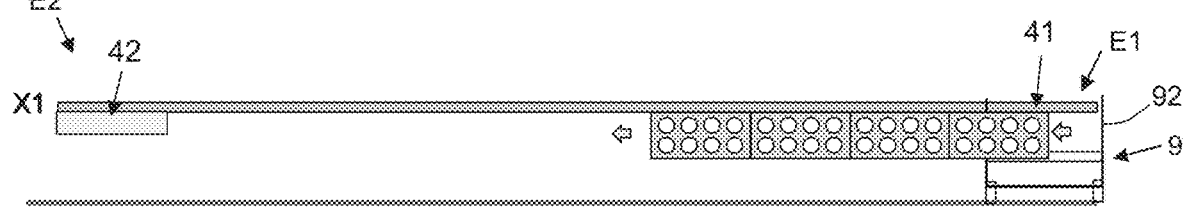
FIG. 23 illustrates the operation of loading the support plates.

The process for unloading the support plates is illustrated by virtue of FIGS. 22 and 23. Each time a support plate arrives at the end of the second portion TC2, that is to say in the vicinity of the first end of the handling system, the support plate, rather than being pivoted into a horizontal position, moves forward straight ahead and takes up a space 94 in the holding pallet 9.

When this plate is in the stop position (for example against the upright 92), the pallet is offset by a distance P9 along the transverse direction Y to align an empty space facing the arrival of the plates in a vertical position. Another plate then arrives and is inserted into the available space, and so on. In this process, note that the first rotary base 41 remains in its horizontal position, that is to say in its second position. Thus, the complementary shapes in the rotary base that are provided to hold a plate arriving in a vertical position do not have any effect here. The plate is thus freed of the guiding shapes since there is no rib 29 provided to fit in the groove 19 at this location (because the rotary base is in a horizontal position rather than in a vertical position as in normal operation).

It should also be noted that if there is an accumulation of plates waiting to be unloaded, the retractable stop 49 makes it possible to keep the plates waiting while the pallet is offset along Y to align an empty space facing the first waiting plate.

Figure 20:
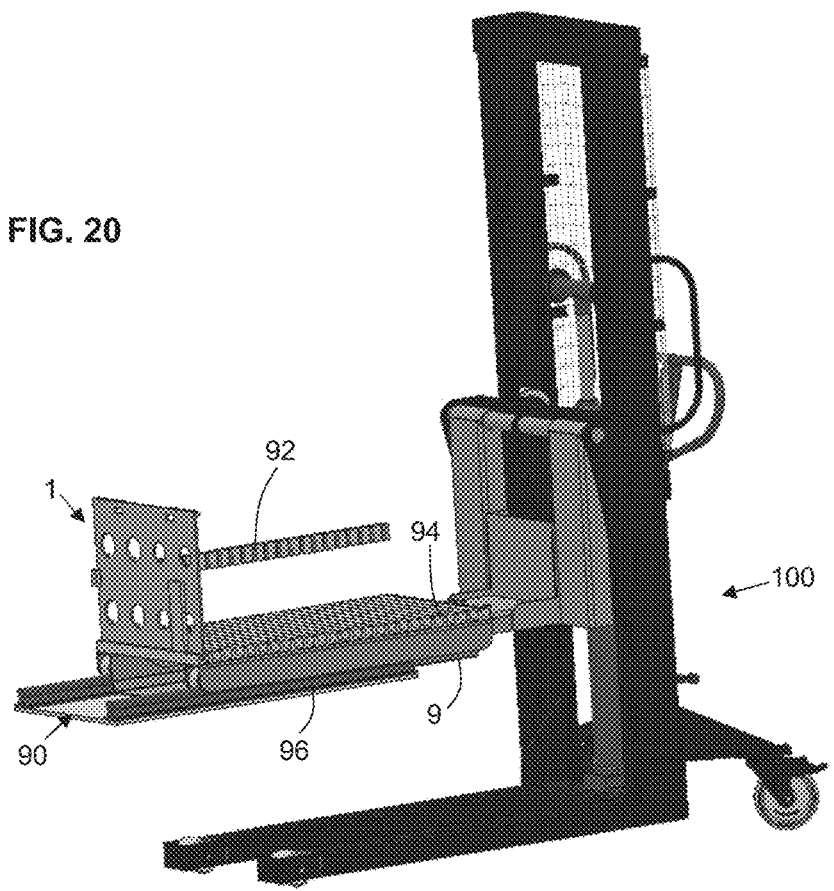
FIG. 20 illustrates a perspective view of a holding pallet, on a forklift, with a single support plate.

The process for loading the support plates in the handling system is illustrated by virtue of FIGS. 20, 21 and 23. The support plates are initially arranged in rows in the spaces 94 of the holding pallet, which is located at the end of the second portion TC2 in the vicinity of the first end E1 of the handling system. The first rotary base 41 remains in its second position, namely the horizontal position.

The belt conveyor, that is to say the second moving member 3, is operated in the opposite direction to the usual direction in order to move up the first plate which is located in a position adjacent to the belt conveyor, and engages with the main guide 40 where the rib 29 fits in the groove 19 at this location. The sliding guide has thus been engaged along the second portion TC2, the only difference from the normal mode being that the plates move in the opposite direction.

Once the plate has completely left the space in the pallet, the movement of the belt is stopped and the pallet is offset by a distance P9 to bring a new support plate into contact with the belt 34. The process is then repeated, meaning that the belt is driven in the opposite direction to the normal direction to move this plate up the wrong way around to the second portion and in the process push the plate which was introduced beforehand further back.

The process continues in the same way to individually insert, opposite to the normal direction, the support plates which are driven by the belt so as to move up the whole of the second portion as far as the second end E2.

According to a variant that is not shown in the drawings, the holding pallet could be installed at the second rotation station PR2, namely under the second rotary base 42. By means of programming logic of the second moving member 3 and of the second rotary base, all of the support plates could also be unloaded onto the holding pallet at the second end of the handling system, and a new set of support plates could also be reloaded at this location.

Figure 24:
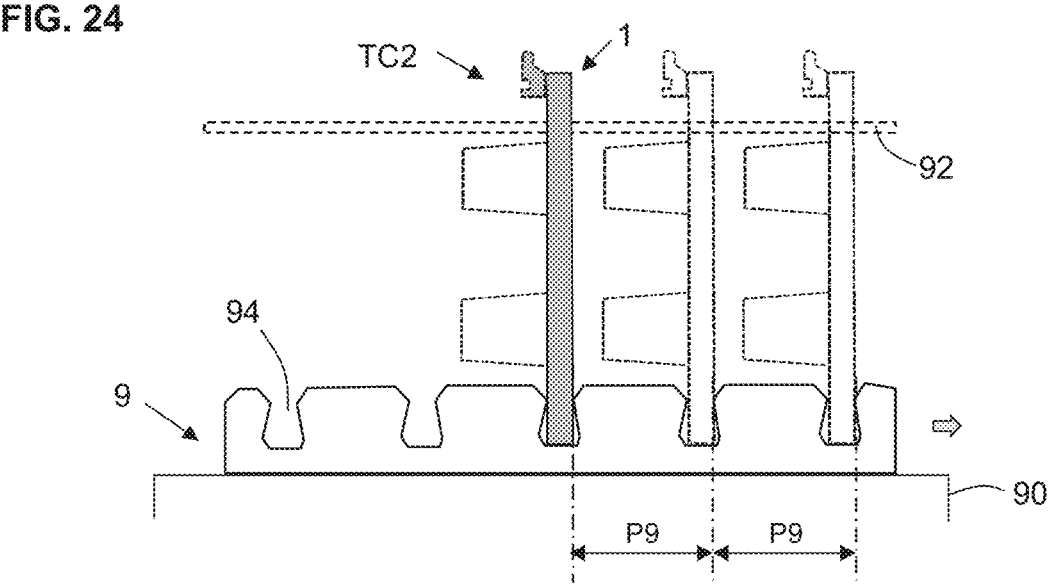
FIG. 24 is similar to FIG. 21 and shows a schematic section through the holding pallet, according to the second embodiment.

With reference to FIG. 24, in the case of container supports offset from the plane of the plate (e.g. shoes 79 or the like), a larger space P9 may be provided to allow a movement in translation along X during the unloading of the plates 1 onto the pallet.

According to another variant that is not shown in the figures, partial nesting of the support plates in one another may be provided on the pallet. A control movement along Y may then be necessary, involving either the use of a mechanism for offsetting along Y as mentioned above or an additional actuator.

An operation for unloading all of the "old" plates followed by an operation of unloading all of the "new" plates was illustrated above in connection with FIGS. 22 and 23.

Figure 25:
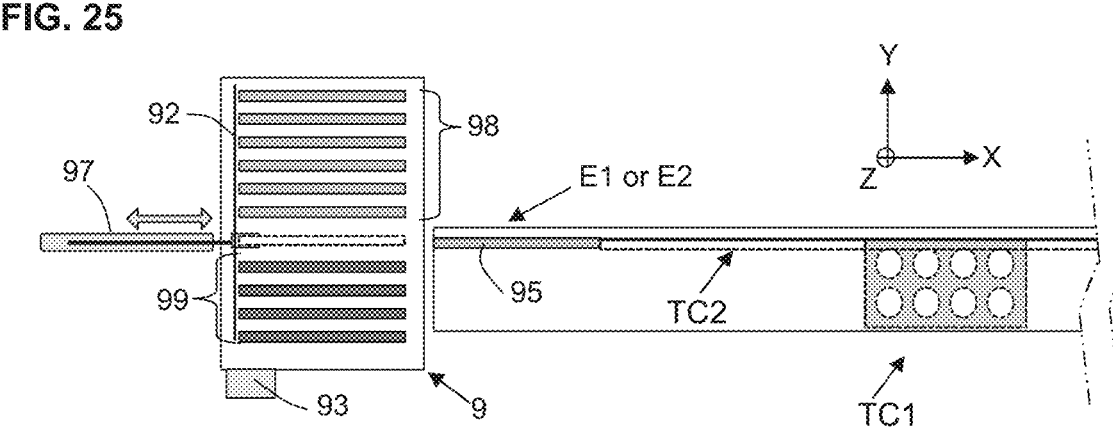
FIG. 25 illustrates the operation of gradually replacing the plates.

FIG. 25 illustrates a top view of a second possibility, consisting of a gradual exchange of the batch of plates; in this case, an "old" plate is unloaded and a "new" plate is installed in its place. This single operation (unloading+ reloading) is repeated as many times as there are plates. When all the plates have been replaced, the pallet fitted with old plates can be moved away.

In practice, to start the replacement operation, the pallet is brought to one of the two ends of the second portion, a locating/alignment system making it possible to simplify implementation. A manipulator 97 is provided.

The manipulator 97 may be a cylinder equipped with a gripper at the end of the rod, for pulling and/or pushing a plate with respect to a space in the second portion TC2. The manipulator is driven in conjunction with the offsetting mechanism 93, which offsets along Y the spaces on the pallet as mentioned above.

With reference to FIG. 25, a plate 95 is in a position close to unloading, the manipulator 97 moves forward and then takes hold of it and then pulls it into the empty space on the pallet, this plate joining the batch of plates that have already been unloaded 98.

Next, the offsetting mechanism 93 offsets the pallet along Y (upwards in the figure) with respect to the frame supporting the pallet. There is then one of the new plates (from the batch 99 of plates to be loaded) facing the guides of the second portion. The manipulator 97 pushes the plate located there from the space on the pallet to the guides of the second portion. Next, the handling system moves the plates and brings an old plate into the position ready for unloading. The operations are thus repeated until all of the plates have been replaced.

The invention claimed is:

1. A handling system in a machine for processing containers intended to hold a food product, the system comprising:
   a plurality of support plates circulating in a closed circuit, each support plate comprising one or more housings, each housing being able to hold a container,
   a first portion, known as the working portion, in which the support plates circulate in a horizontal position along a first axial direction, with a first member for moving the support plates along the first axial direction,
   a second portion, known as the return portion, with a second moving member configured to move the support plates in a second axial direction opposite to the first axial direction,
   wherein the support plates circulate in the second portion in a return orientation, said return orientation being vertical or angularly less than 30° away from the vertical, and
   the handling system comprises:
      a first rotation station arranged at a first end of the handling system and
   configured, in normal operation, to pivot the support plates into the horizontal position in order to engage them in the first portion,
      a second rotation station arranged at a second end of the handling system and configured, in normal operation, to pivot the support plates into the return orientation in order to engage them in the second portion, and
   the handling system comprises at least one pallet for holding a plurality of support plates, which is configured to hold preferably all of the support plates required for the normal operation of the machine, said holding pallet cooperating with the first or the second rotation station and the second moving member to selectively either unload the support plates from the second portion onto the holding pallet or to load the support plates from the holding pallet into the second portion.

2. The system according to claim 1, wherein the first rotation station comprises a first rotary base, said rotary base being movable between a first position suitable for receiving a support plate arriving in the second portion in a return orientation and a second position suitable for placing a support plate in a horizontal position at the inlet of the first portion.

3. The system according to claim 1, wherein the holding pallet cooperates with the first rotation station.

4. The system according to claim 3, wherein, in a configuration for unloading the support plates from the second portion onto the holding pallet, the first rotary base remains in its second position so as to allow each support plate to enter the first rotation station with its return orientation, said support plate then being inserted into a space on the holding pallet.

5. The system according to claim 3, wherein, in a configuration for loading the support plates from the holding pallet into the second portion, the first rotary base remains in its second position and the second moving member operates in the opposite direction to its normal operation in order to remove each support plate from a space on the holding pallet and to move up each support plate to the second portion with its return orientation.

6. The system according to claim 1, wherein the holding pallet comprises a plurality of spaces, which are spaced apart from and parallel to one another, and an offsetting mechanism, located on or off the pallet itself, is provided, so as to position a space in alignment with the travel of the support plates in the second portion, in order to unload or load a support plate respectively from or into the second portion.

7. The system according to claim 6, wherein the support plates are held in a vertical position on the holding pallet and are kept in the spaces in a vertical position, additionally with a lack of mutual contact between the support plates.

8. The system according to claim 2, wherein a stopping element for selectively stopping or enabling the forward travel of the support plates toward the first rotary base is provided, wherein:
   the stopping element prevents the arrival of the support plate at the first rotary base if the first rotary base is not in its first position, and,
   in the unloading mode, the stopping element prevents the arrival of the support plate if a space in the holding pallet is not available for holding the support plate.

9. The system according to claim 1, wherein the second rotation station comprises a second rotary base.

10. The system according to claim 1, wherein the second moving member is in the form of an endless belt conveyor.

11. The system according to claim 1, wherein the holding pallet comprises a holding upright with slots for keeping the plates in a vertical position.

12. A machine for processing pots or bottles for food products, comprising a handling system according to claim 1.

* * * * *